United States Patent
Lewis et al.

(10) Patent No.: US 7,853,242 B2
(45) Date of Patent: Dec. 14, 2010

(54) BYPASS ROUTING TO A MOBILE DEVICE

(75) Inventors: Allan David Lewis, New Dundee (CA); George Dos Santos, Kitchener (CA); Russell N. Owen, Waterloo (CA); Wen Gao, Waterloo (CA); Philip C. Luk, Waterloo (CA); David A. Bajar, Kitchener (CA); David P. Yach, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 816 days.

(21) Appl. No.: 11/015,007

(22) Filed: Dec. 20, 2004

(65) Prior Publication Data

US 2006/0133329 A1    Jun. 22, 2006

(51) Int. Cl.
*H04M 1/66*  (2006.01)
*H04W 36/00* (2009.01)

(52) U.S. Cl. ........................................ 455/411; 455/436

(58) Field of Classification Search ........................ None
See application file for complete search history.

(56) References Cited

U.S. PATENT DOCUMENTS

| | | | | |
|---|---|---|---|---|
| 5,835,721 | A * | 11/1998 | Donahue et al. | 709/224 |
| 6,272,129 | B1 * | 8/2001 | Dynarski et al. | 370/356 |
| 6,836,474 | B1 * | 12/2004 | Larsson et al. | 370/338 |
| 2002/0031108 | A1 | 3/2002 | Inoue | |
| 2002/0191627 | A1 | 12/2002 | Subbiah et al. | |
| 2002/0198977 | A1 | 12/2002 | Cho | |
| 2004/0176071 | A1 * | 9/2004 | Gehrmann et al. | 455/411 |
| 2004/0203815 | A1 | 10/2004 | Shoemake et al. | |
| 2005/0004968 | A1 * | 1/2005 | Mononen et al. | 709/200 |
| 2005/0164704 | A1 * | 7/2005 | Winsor | 455/432.3 |
| 2005/0169249 | A1 * | 8/2005 | Shirota et al. | 370/352 |
| 2005/0239496 | A1 * | 10/2005 | Sylvain | 455/552.1 |

FOREIGN PATENT DOCUMENTS

| | | |
|---|---|---|
| DE | 20311008 U1 | 1/2004 |
| GB | 2376847 A | 12/2002 |
| WO | 03065682 A1 | 8/2003 |

OTHER PUBLICATIONS

Anderson, D. & Christensen, F., WebSphere Everyplace Connection Manager: Increasing Mobile Security, Reducing Wireless Costs, Security-enhanced IBM Solution for mobile enterprises and Service Providers, IBM, Apr. 2003 (Retrived from www-1.ibm.com/industries/wireless/doc/content/bin).

\* cited by examiner

*Primary Examiner*—Nick Corsaro
*Assistant Examiner*—Joel Ajayi
(74) *Attorney, Agent, or Firm*—Smart & Biggar

(57) ABSTRACT

A bypass server is placed in an outgoing link between a mobile device server and a relay used to distribute data from the mobile device server to remote mobile devices to which the data is addressed. Where a direct connection is established between a suitably configured network node (such as a personal computer) and a given mobile device, the bypass server may form a local connection with the network node and divert along the local connection those packets that are addressed to the given mobile device. As such, a lower cost/higher bandwidth local communication path between the given mobile device and the mobile device server may be established, when compared to the conventional remote communication path. The local communication path may be especially useful for bulk data transfers.

26 Claims, 9 Drawing Sheets

US 7,853,242 B2

BYPASS ROUTING TO A MOBILE DEVICE

FIELD OF THE INVENTION

The present invention relates to mobile communication devices and, more particularly, to methods and apparatus for routing information to such devices over a local network connection.

BACKGROUND

A mobile station typically has access to cellular radio frequency bandwidth offering data transfer speeds in the range of 28.8 kilobits per second to 144 kilobits per second. In general, the bandwidth available to mobile stations is an order of magnitude less than the bandwidth available to standard office computer equipment such as desktop personal computers and laptop personal computers using so-called "wireline" networking technologies.

There exists a class of mobile stations, such as personal digital assistants (PDAs), cellular phones and so-called "smart" phones, that can operate when connected to a (remote) wireless network as well as when connected (cradled) to office computer equipment that is connected to a (local) wireline network. When connected to office computer equipment, it is common for local software, executed on the office computer equipment, to facilitate the retrieval of data for use by a given mobile station by requesting synchronization with (i.e., pulling data from) a server of such data and subsequently for the given mobile station to synchronize with the local software.

A subset of the mobile stations may be configured to receive unsolicited data over a wireless network from so-called "push" applications.

Clearly, it would be beneficial to improve the availability of higher bandwidth connections (for instance, local network connections to standard office computer equipment) to mobile stations, especially for receiving unsolicited data from push applications.

SUMMARY

While a server is pushing data out to a mobile data communication device assumed to be accessible by a remote connection, a router may determine whether the transfer of the data to the mobile data communication device may be achieved by using another connection. To this end, it is initially necessary to determine when the mobile data communication device has formed a connection to a network node accessible by another connection. Optionally, it may be determined whether the data transfer would be best achieved (in terms of cost) by using the other connection.

In accordance with an aspect of the present invention there is provided a method of routing protocol data units to a mobile data communication device. The method includes receiving a protocol data unit from a server for serving information to mobile data communication devices, the protocol data unit directed for delivery over a remote network connection and specifying a destination address. The method also includes determining an identity of a mobile data communication device from the destination address, determining an association between the identity and a second network connection and redirecting the protocol data unit over the second network connection. In other aspects of the present invention, a routing apparatus is provided for carrying out this method and a computer readable medium is provided for adapting a routing apparatus to carry out this method.

In accordance with another aspect of the present invention there is provided, at a mobile communication device, a method of routing data to a server of mobile communication devices. The method includes determining whether a path to the server is available, where the path includes a local connection, determining a type for a data transfer and, where the type for the data transfer is among a set of types pre-determined to be suited to local connections to the server and the local connection to the server is determined to be available, routing the data transfer over the path. In other aspects of the present invention, a mobile communication device is provided for carrying out this method and a computer readable medium is provided for adapting a mobile communication device to carry out this method.

In accordance with a further aspect of the present invention there is provided, at a mobile communication device, a method of routing data to a server to such mobile communication devices. The method includes determining whether a path to the server is available, where the path includes a local connection, determining a type for a data transfer and where the type for the data transfer is among a set of types pre-determined to be suited to local connections to the server and the local connection to the server is determined to be unavailable, deferring the data transfer until a time at which the local connection is determined to be available.

In accordance with a still further aspect of the present invention there is provided, at a mobile data communication device, a method of handling a data transfer between the mobile data communication device and a server of data to such mobile devices. The method includes detecting an availability of a path to the server, where the path includes a local connection, where the local connection is local to both the mobile data communication device and the server and where a data transfer is in progress over a remote connection to the server, routing the data transfer over the path.

In accordance with an even further aspect of the present invention there is provided, at a mobile data communication device, a method of handling a data transfer between the mobile data communication device and a server of data to such mobile devices. The method includes detecting an end to availability of a path to the server, where the path includes a local connection, where the local connection is local to both the mobile data communication device and the server and where a data transfer is in progress over the path to the server, routing the data transfer over a remote connection to the server.

In accordance with an even further aspect of the present invention there is provided a method of communicating with a bypass server in an enterprise network, the method includes detecting establishment of a direct connection to a mobile data communication device, receiving a request, from the mobile data communication device, to form a local connection on a path to a server of mobile devices, determining an identity of the mobile data communication device and indicating to the bypass server that the direct connection has been established to the mobile data communication device having the identity. In another aspect of the present invention, a computer readable medium is provided for adapting a mobile communication device to carry out this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
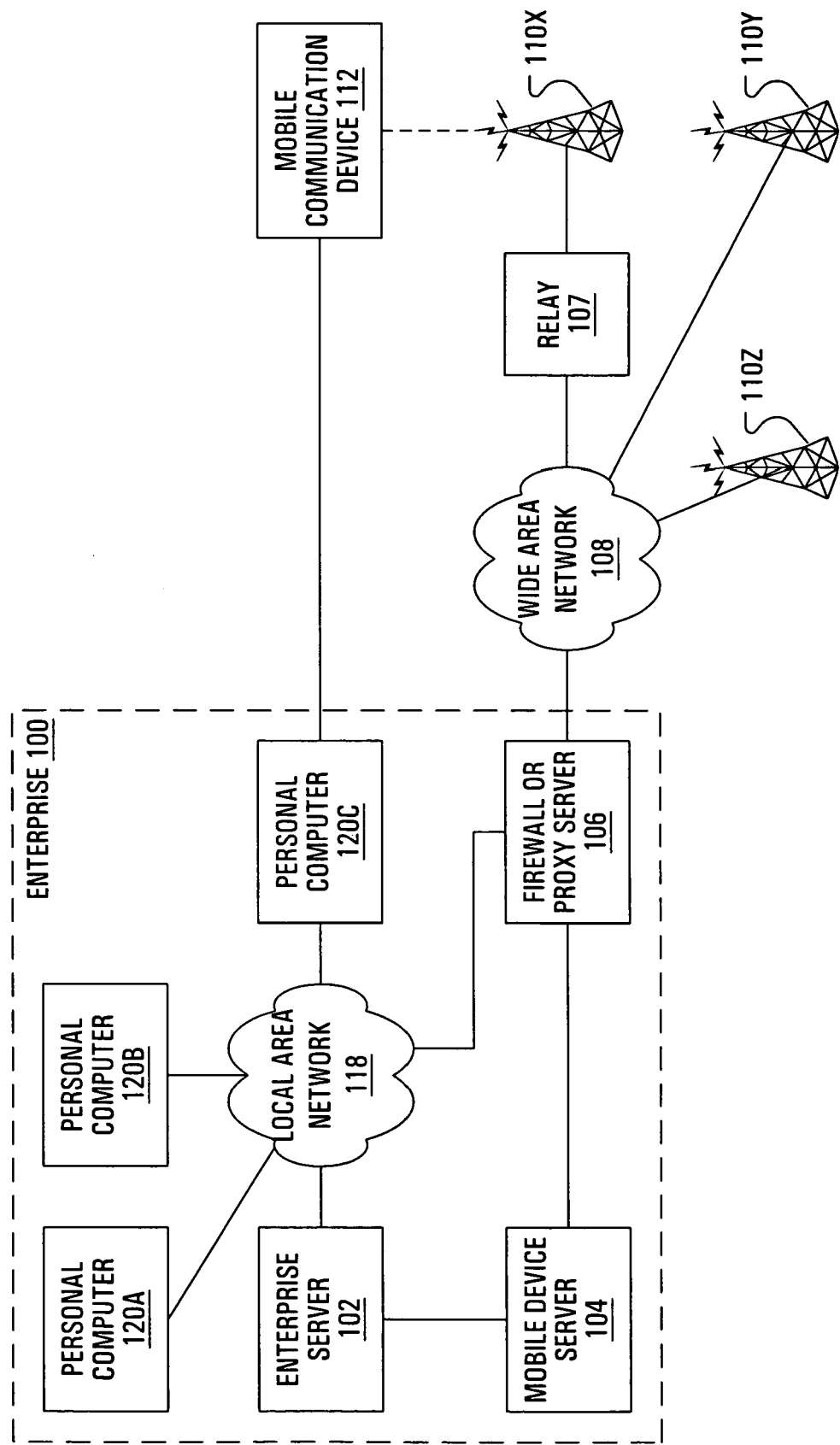
FIG. 1 illustrates a communication network including an enterprise with a wireless connection to a mobile data communication device.

As illustrated in FIG. 1, an enterprise 100 includes a local area network (LAN) 118 with a number of network nodes 120 (such as suitably configured personal computers—PCs 120A, 120B, 120C) connected to a central enterprise server 102 via the LAN 118. The enterprise server 102, which may, for instance, be a Microsoft™ Exchange Server providing e-mail, calendar events and contact details, is connected to a wide area network (WAN, such as the public Internet) 108 via a firewall or proxy server 106. Multiple wireless carrier networks 110X, 110Y, 110Z (collectively or individually 110) operated by wireless carriers also connect to the WAN 108, as does a relay 107. An exemplary wireless carrier network 110X of the multiple wireless carrier networks 110 is illustrated as connected to the WAN 108 via a connection to the relay 107. Mobile communications devices, such as an exemplary mobile communications device 112, may be connected to one or other of the wireless carrier networks 110.

The mobile device 112 may be connected to a PC 120C over a direct connection. Typically, this direct connection is accomplished by placing the mobile device 112 into a "cradle" (not shown) customized to fit the mobile device 112. The cradle is generally connected to the PC 120C by way of a standard 9-pin serial cable connection or a Universal Serial Bus (USB) connection. Often the direct connection is accomplished without the use of a cradle as a connection cable plugs directly into the mobile device 112. Alternatively, a local wireless connection (e.g., using Bluetooth™ networking technology or infrared networking technology) may be utilized to connect the mobile device 112 to the PC 120C.

The enterprise 100 may take advantage of centralized management services for wireless communications by installing a mobile device server 104 with a connection via the firewall 106 to the WAN 108.

Figure 2:
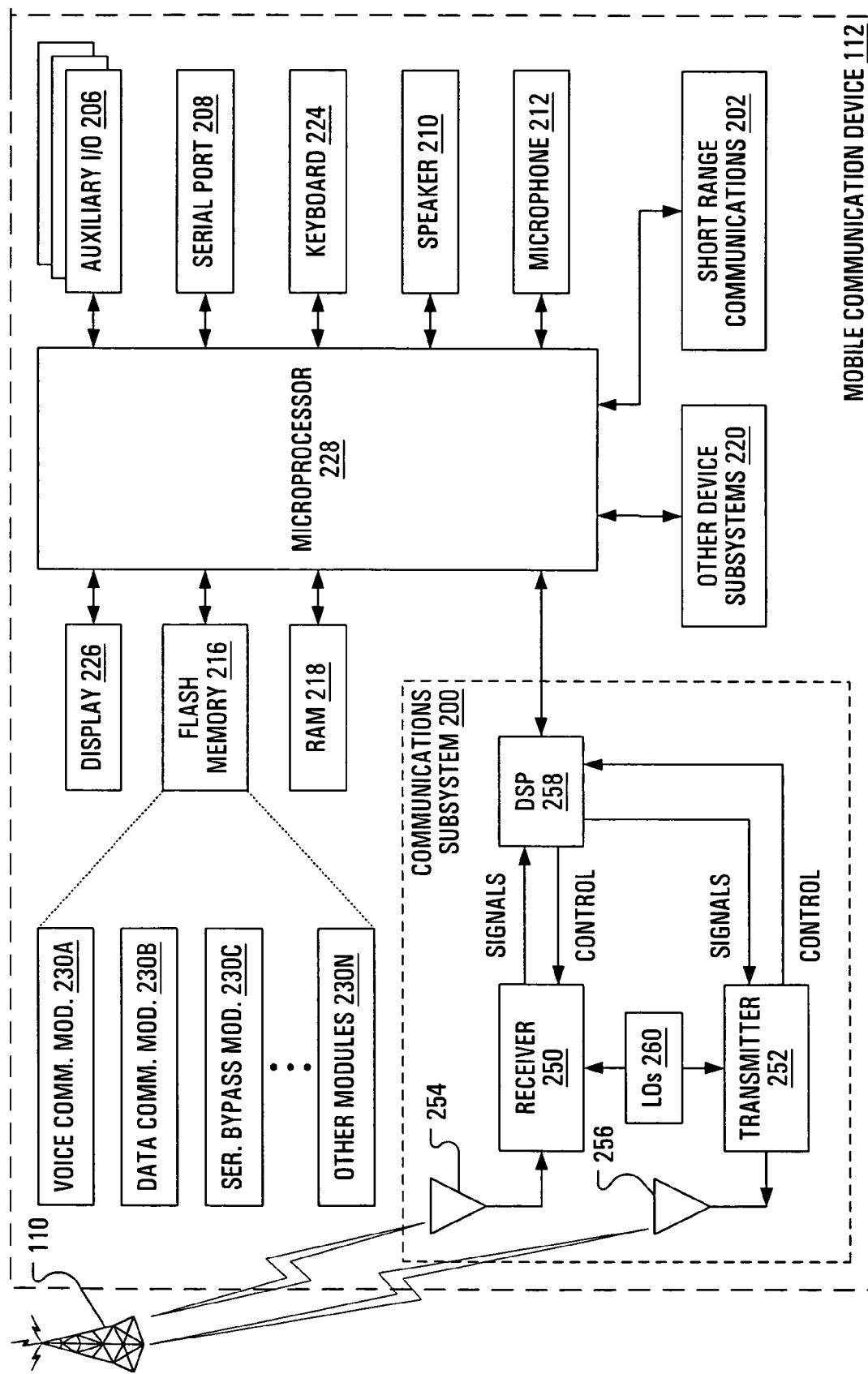
FIG. 2 illustrates components of an exemplary mobile data communication device for use in the communication network of FIG. 1.

FIG. 2 illustrates the handheld mobile communication device 112 including a housing, an input device (a keyboard 224), and an output device (a display 226), which is preferably a full graphic or full color Liquid Crystal Display (LCD). Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile device 112, in response to actuation of keys on the keyboard 224 by a user.

The housing may be elongated vertically, or may take on other sizes and shapes (including clamshell housing structures). The keyboard may include a mode selection key, or other hardware or software, for switching between text entry and telephony entry.

In addition to the microprocessor 228, other parts of the mobile device 112 are shown schematically in FIG. 2. These include: a communications subsystem 200; a short-range communications subsystem 202; the keyboard 224 and the display 226, along with other input/output devices including a set of auxiliary I/O devices 206, a serial port 208, a speaker 210 and a microphone 212; as well as memory devices including a flash memory 216 and a Random Access Memory (RAM) 218; and various other device subsystems 220. The mobile device 112 is preferably a two-way radio frequency (RF) communication device having voice and data communication capabilities. In addition, the mobile device 112 preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile device 112. A predetermined set of software applications that control basic device operations, such as a voice communications module 230A and a data communications module 230B, may be installed on the mobile device 112 during manufacture. A serial bypass module 230C may also be installed on the mobile device 112 during manufacture, to implement aspects of the present invention. As well, additional software modules, illustrated as an other software module 230N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via the wireless carrier network 110. Preferably, the data items managed by the PIM application are seamlessly integrated, synchronized and updated via the wireless carrier network 110 with the device user's corresponding data items stored or associated with a host computer system.

Communication functions, including data and voice communications, are performed through the communication subsystem 200, and possibly through the short-range communications subsystem 202. The communication subsystem 200 includes a receiver 250, a transmitter 252 and one or more antennas, illustrated as a receive antenna 254 and a transmit antenna 256. In addition, the communication subsystem 200 also includes a processing module, such as a digital signal processor (DSP) 258, and local oscillators (LOs) 260. The specific design and implementation of the communication subsystem 200 is dependent upon the communication network in which the mobile device 112 is intended to operate. For example, the communication subsystem 200 of the mobile device 112 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 112.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Subscriber Identify (IMSI) number.

When required network registration or activation procedures have been completed, the mobile device 112 may send and receive communication signals over the wireless carrier network 110. Signals received from the wireless carrier network 110 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 110 are processed (e.g., modulated and encoded) by the DSP 258 and are then provided to the transmitter 252 for digital to analog conversion, frequency up conversion, filtering, amplification and transmission to the wireless carrier network 110 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 200 and is input to the microprocessor 228. The received signal is then further processed by the microprocessor 228 for an output to the display 226, or alternatively to some other auxiliary I/O devices 206. A device user may also compose data items, such as e-mail messages, using the keyboard 224 and/or some other auxiliary I/O device 206, such as a touchpad, a rocker switch, a thumb-wheel, or some other type of input device. The composed data items may then be transmitted over the wireless carrier network 110 via the communication subsystem 200.

In a voice communication mode, overall operation of the device is substantially similar to the data communication mode, except that received signals are output to a speaker 210, and signals for transmission are generated by a microphone 212. Alternative voice or audio I/O subsystems, such as a voice message recording subsystem, may also be implemented on the device 1112. In addition, the display 226 may also be utilized in voice communication mode, for example, to display the identity of a calling party, the duration of a voice call, or other voice call related information.

The short-range communications subsystem 202 enables communication between the mobile device 112 and other proximate systems or devices, which need not necessarily be similar devices. For example, the short-range communications subsystem may include an infrared device and associated circuits and components, or a Bluetooth™ communication module to provide for communication with similarly-enabled systems and devices.

In FIG. 1, the mobile device 112 may become associated with the enterprise 100 through the direct connection between the mobile device 112 and the PC 120C of the enterprise 100 while an association process is executed at the PC 120C.

The result of the association process may be the uploading of a device identifier of the mobile device 112 to the PC 120C and the downloading of a Unique Identifier (UID) of the mobile device server 104 from the PC 120C to the mobile device 112. The device identifier may be considered a characteristic of the mobile device 112 (e.g., a device identifier may be burned into the mobile device 112). The UID of the mobile device server 104 normally does not change.

To provide centralized wireless management services, the relay 107 establishes a communication path with the multiple wireless carrier networks 110. Specifically, the relay 107 may have an established communication path with each of the wireless carrier networks 110Y, 110Z that is connected to the WAN 108 through a virtual private network (VPN). Further, each wireless carrier network accessible only over a private line may have a private line to the relay 107. Thus, for example, the exemplary wireless carrier network 110X has an established communication path to relay 107.

The mobile device server 104 provides the UID for the mobile device server 104 and the current address of the mobile device server 104 to the relay 107.

With the described set-up, the mobile device server 104, in conjunction with the relay 107, may provide centralized management of wireless communications, as follows. After the mobile device 112 registers (in conventional fashion) with one of the wireless carrier networks 110 with which the relay 107 has an established communications path, the mobile device 112 sends a registration packet with its device identifier and the UID of the mobile device server 104 with which the mobile device 112 is associated. This registration packet is received by the wireless carrier network 110X and directed to the relay 107 with an identity of the wireless carrier network 110X. On receiving this registration packet, the relay 107 associates the wireless carrier network 110X with the device identifier and returns a packet to the mobile device 112 with its own address. Any subsequent packets sent by the mobile device 112 are addressed to the relay 107. These subsequent packets include an indication of the UID. Utilizing the UID, the relay 107 looks up the address of the mobile device server 104 and forwards the packet to the mobile device server 104 associated with the UID, via the WAN 108.

Note that the term "packet" is used herein for an addressed unit of data that may also be called a "message", a "frame" or, more generically, a "protocol data unit".

A packet from the enterprise server 102 intended for the mobile device 112 is addressed by the mobile device server 104 to the relay 107 and includes the device identifier of the mobile device 112. The packet is forwarded to the relay 107 via the firewall 106. On the one hand, if the relay 107 holds an association of the device identifier with a given wireless carrier network 110, the packet is forwarded to that wireless carrier network 110. On the other hand, in the absence of such an association, the intended recipient mobile device 112 may be considered to be unreachable, i.e., not currently connected to, or registered with, any of the wireless carrier networks 110 with connections to the relay 107. In such circumstances, the relay 107 may simply store the packet until the relay 107 becomes aware of an association of the recipient mobile device 112 with one of the wireless carrier networks 110 to which a connection has been established. Alternatively, the relay 107 may return the packet to the mobile device server 104 with an indication that the mobile device 112 is unreachable.

Figure 3:
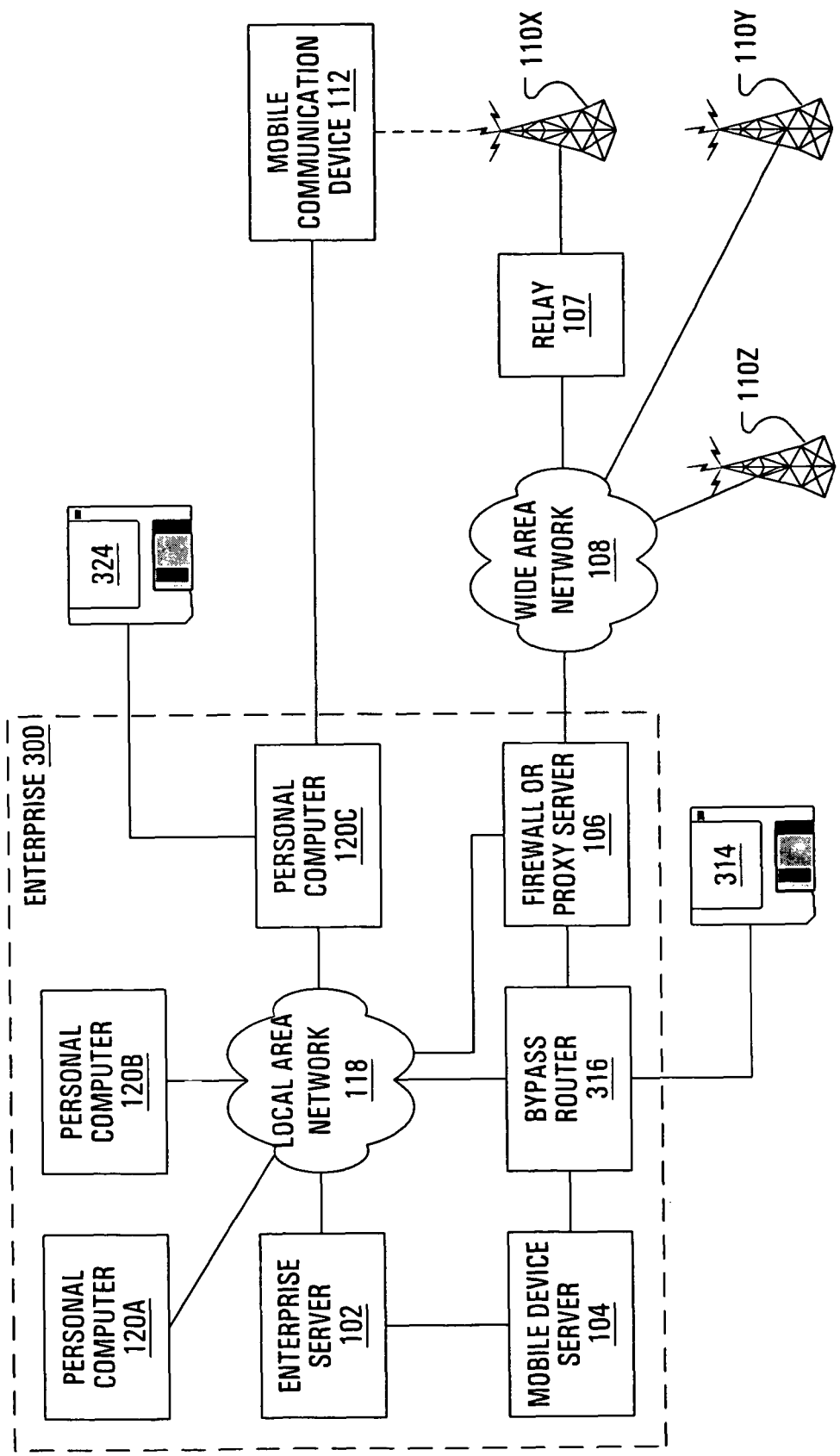
FIG. 3 illustrates a communication network including an enterprise with a wireless connection to a mobile data communication device, where the enterprise includes a bypass router according to an embodiment of the present invention.

In FIG. 3, an enterprise 300 is illustrated with many elements in common with the enterprise 100 of FIG. 1. Among elements of the enterprise 300 of FIG. 3 not found in the enterprise 100 of FIG. 1, a bypass router 316 is provided in the link between the mobile device server 104 and the firewall 106. The bypass router 316 may be loaded with computer executable instructions for executing methods exemplary of the present invention from a computer readable medium 314, which could be a disk, a tape, a chip or a random access memory-containing a file downloaded from a remote source. Similarly, the PC 120C may be loaded with computer executable instructions for executing methods exemplary of the present invention from a computer readable medium 324, which could be a disk, a tape, a chip or a random access memory containing a file downloaded from a remote source.

As will be apparent to a person of skill in the art, the PC 120C may be located external to the enterprise 300. Although not illustrated, the PC 120C may only have a connection to the WAN 108 and may have established a Virtual Private Network (VPN) connection to the LAN 118 (via the firewall 106, but bypassing the relay 108), as is common practice. The connection between the PC 120C and the WAN 108 may be wired, for instance, if the PC 120C is in the user's home and the enterprise is at the user's workplace. Alternatively, the connection between the PC 120C and the WAN 108 may be wireless, for instance, if the PC 120C is a laptop computer and is being used in an airport or coffee shop.

Figure 9:
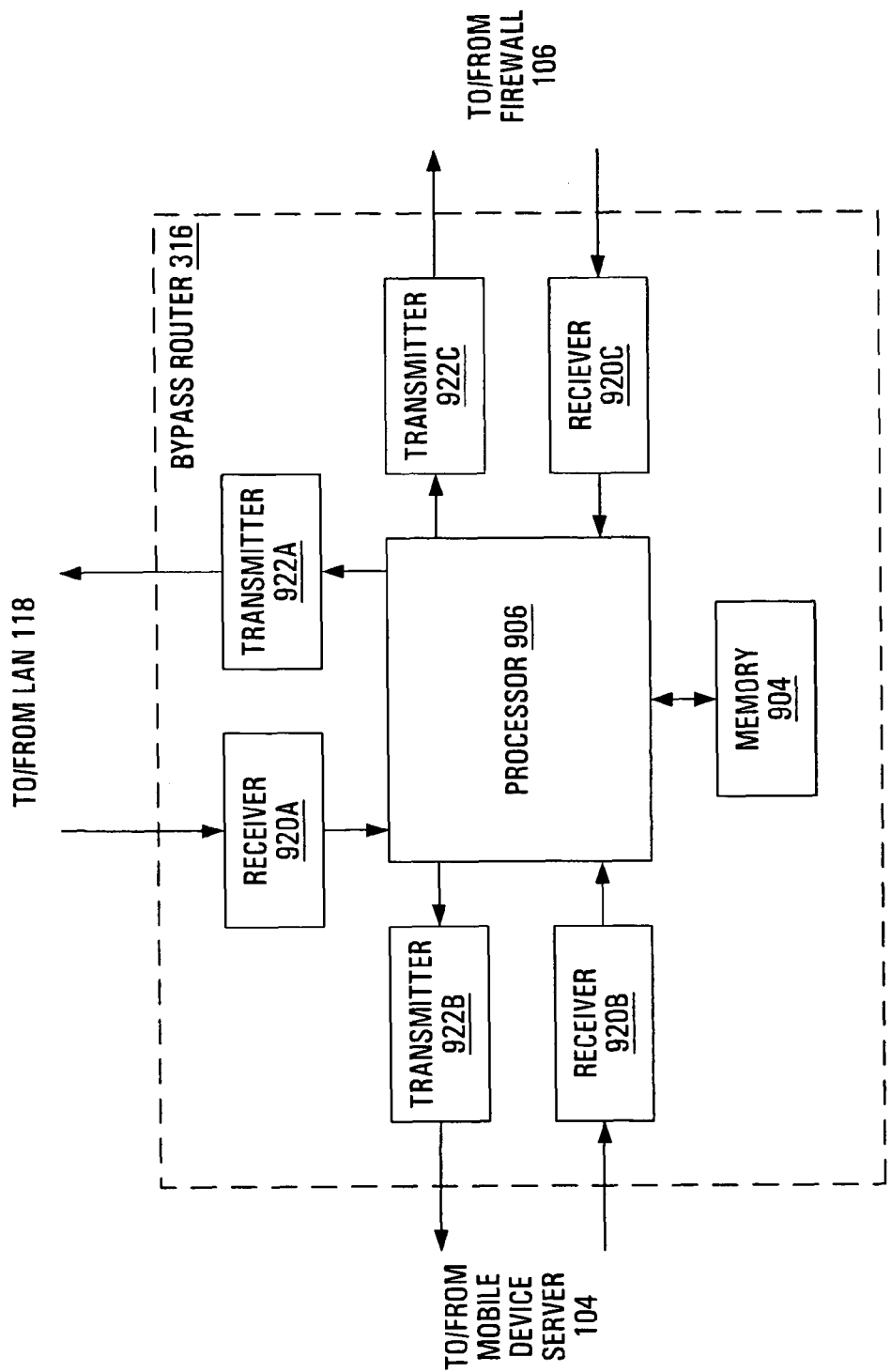
FIG. 9 schematically illustrates an exemplary design for the bypass router of FIG. 3 according to an embodiment of the present invention.

An exemplary design for the bypass router 316 is illustrated in FIG. 9 to include a processor 906. Connected to the processor 906 are elements to allow communication with the various elements of the enterprise 300 of FIG. 3. In particular, a transmitter 922A and a receiver 920A allow communication with the LAN 118, a transmitter 922B and a receiver 920B allow communication with the mobile device server 104 and a transmitter 922C and a receiver 920C allow communication with the firewall 106. In addition, the processor 906 may be connected to a memory 904. Although FIG. 9 shows three different interfaces (each including a transmitter 922 and a receiver 920), it should be understood by a person of ordinary skill in the art that the bypass router 316 is more likely to include a single LAN interface with logical connections to the mobile device server 104, the LAN 118 and the firewall 106 all over the same interface.

In overview, the direct connection between the PC 120C and the mobile device 112 in combination with the local connection between the PC 120C and the bypass router 316 may be utilized for delivery to the mobile device 112 of packets from the mobile device server 104 when the mobile device 112 is in the cradle or otherwise provided with a direct connection to the PC 120C. Transparent to the mobile device server 104, the bypass router 316 redirects packets destined for the mobile device 112 over the local connection to the PC 120C that has a direct connection with the mobile device 112. To facilitate such redirection, the PC 120C may be provided with a bypass driver, implemented as computer executable instructions (from the computer readable medium 324) executed on the PC 120C.

The bypass driver at the PC 120C detects the establishment of a direct connection between the PC 120C and the mobile device 112. The bypass driver then receives a request, from the mobile device 112, to form a local connection on a path to the mobile device server 104. However, the bypass driver, instead, forms a local connection to the bypass router 316. In response to receiving the request, the bypass driver indicates to the bypass router 316 that the direct connection has been established. As part of the establishment of the direct connection, the bypass driver determines the identity of the mobile device 112 such that, when indicating to the bypass router 316 that the direct connection has been established the bypass driver also indicates the identity of the mobile device 122 with which the direct connection has been established. The bypass router 316 and the PC 120C then form a local connection. Subsequently, packets from the mobile device server 104 to the mobile device 112 are diverted away from the connection to the relay onto the local connection to the PC 120C. In the reverse direction, the bypass router 316, in conjunction with the bypass driver, directs packets from the mobile device 112 to the mobile device server 104. As such, the local connection between the bypass router 316 and the bypass driver may be considered to be bidirectional.

The bypass driver may be configured to operate only with a single mobile device or to operate with a main mobile device and multiple "guest" mobile devices.

Advantageously, the bypass router 316 may be configured to support multiple routes across multiple remote and local technologies to the mobile device 112, based on the location of the mobile device at a specific point in time. To this end, the bypass router 316 may be configured to maintain a last-known location of the mobile device 112. Such location knowledge may be gained through interpretation of packets between the remotely connected mobile device 112 and the mobile device server 104 or through receipt of indications from the bypass driver that the mobile device 112 is connected locally via a direct connection to a PC 120, or both. In particular, the bypass router 316 may be informed by the bypass driver when the mobile device 112 connects via a direct connection to a PC 120. The bypass router 316 may react by forming a local connection to the PC 120 and attempting to deliver a packet to the mobile device 112 via the local connection to the PC 120. Due to the interposition of the bypass router 316 in the route from the relay 107 to the mobile device server 104, the bypass router 316 may interpret packets passing between the two elements to determine the state of the wireless connection to the mobile device 112. When either the local connection or the remote connection is dropped, the bypass router 316 may continually attempt to deliver a packet to the mobile device 112 using the dropped connection while routing packets to the working connection.

As stated hereinbefore, the bypass router 316 may be installed in the link, via the firewall 106, between the mobile device server 104 and the relay 107. The bypass router 316 may divert packets over a local connection to the PC 120C with a direct connection to the mobile device 112 when the mobile device 112 is directly connected to the PC 120C.

Upon forming a direct connection with the PC 120C, the mobile device 112 identifies the mobile device server 104 to which a connection is desired. In response, the bypass driver initiates the formation of a local connection between the PC 120C and the bypass router 316. In the event that the mobile device 112 is connected to the relay 107 via a wireless carrier network 110 using GSM/GPRS. The mobile device 112 may maintain the wireless connection to the relay 107 open through a mechanism called GCMP "pings". This maintenance may be continued even when all necessary services are determined to be available through the local connection.

For each conventional wireless (remote) connection between the mobile device server 104 and the mobile device 112, the mobile device server 104 typically creates a bidirectional connection to the relay 107. The mobile device server 104 and the relay 107 authenticate each other using a predetermined authentication sequence. When the bypass router 316 is installed in the link between the mobile device server 104 and the relay 107, the mobile device server 104 creates a bidirectional connection to the bypass router 316 and the bypass router 316 creates a bidirectional connection to the relay 107 via the firewall 106. These connections may, for instance, be implemented using the known Transmission Control Protocol (TCP). The predetermined authentication sequence between the mobile device server 104 and the relay 107 may take place even when the bypass router 316 is interposed between the devices through the configuration of the bypass router 316 to pass through authentication protocol packets containing a connection-specific authentication key and UID employed in the predetermined authentication sequence. As such, the bypass router 316 does not have to be configured with the UID already associated with the mobile device server 104 and the corresponding authentication key. However, the bypass router 316 may be configured to maintain a record associating each connection to the relay 107 with the UID that is associated with the mobile device server 104.

A similar (if not identical) authentication protocol may be used to allow the mobile device 112 and the mobile device server 104 to authenticate each other. Ideally, the mobile device server 104 is unaware of the true nature of the device (relay 107 or mobile device 112) with which the sequence of authentication packets is being exchanged. Preferably, the exchange of authentication packets between the mobile device 112 and the mobile device server 104 occurs in a manner in which the bypass router 316 can verify successful authentication without knowing the secret key held by the mobile device 112 and the mobile device server 104.

An exemplary authentication protocol combines two runs of the Schnorr identification scheme to provide mutual authentication for the mobile device 112 and mobile device server 104. For information on the Schnorr identification scheme, see A. Menezes, P. van Oorschot and S. Vanstone, *Handbook of Applied Cryptography*, CRC Press, New York, N.Y., 1997, hereby incorporated herein by reference.

Figure 4:
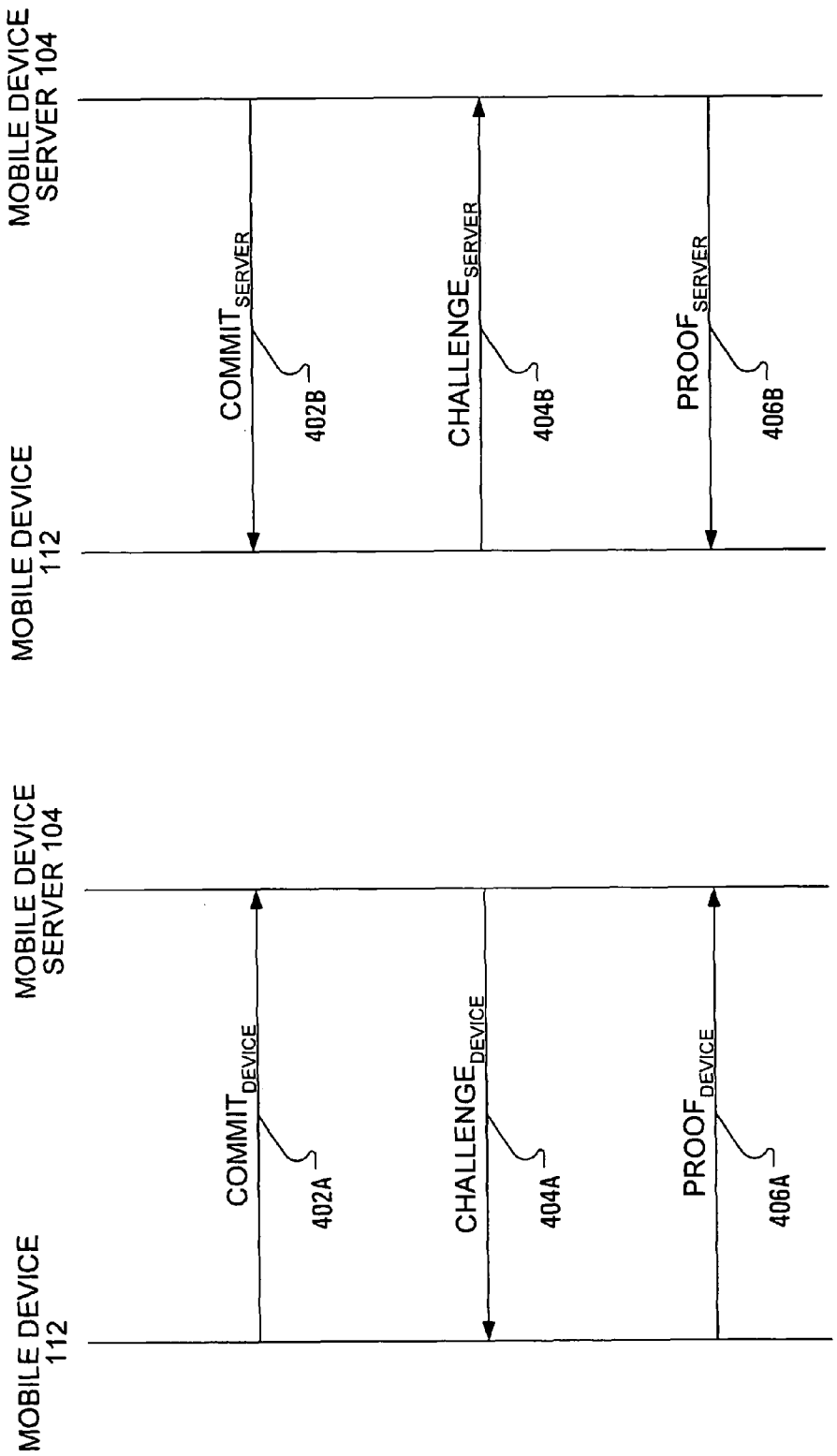
FIG. 4A illustrates packet flow in an authentication sequence between a mobile device server and a mobile data communication device, where the sequence is initiated by a mobile data communication device.
FIG. 4B illustrates packet flow in an authentication sequence between a mobile device server and a mobile data communication device, where the sequence is initiated by the mobile device server.

The first run of the Schnorr identification scheme, illustrated in FIG. 4A allows the mobile device 112 to authenticate itself to the mobile device server 104. In particular, the mobile device 112 selects a random number and determines a commitment using a master encryption key. The mobile device 112 then sends the commitment to the mobile device server 104 (step 402A). The mobile device server 104 selects a random challenge and sends the challenge to the mobile device 112 (step 404A). The mobile device 112 then uses the received challenge along with the original random number to determine a proof. The mobile device 112 then sends the proof to the mobile device server 104 (step 406A). The mobile device server 104 uses the commitment, a public cryptographic key associated with the mobile device 112, the proof and the challenge to authenticate the mobile device 112.

The second run of the Schnorr identification scheme, illustrated in FIG. 4B allows the mobile device server 104 to authenticate itself to the mobile device 112. In particular, the mobile device server 104 selects a random number and determines a commitment using the master encryption key. The mobile device server 104 then sends the commitment to the mobile device 112 (step 402B). The mobile device 112 selects a random challenge and sends the challenge to the mobile device server 104 (step 404B). The mobile device server 104 then uses the received challenge along with the original random number to determine a proof. The mobile device server 104 then sends the proof to the mobile device 112 (step 406B). The mobile device 112 uses the commitment, a public cryptographic key associated with the mobile device server 104, the proof and the challenge to authenticate the mobile device server 104.

Figure 5:
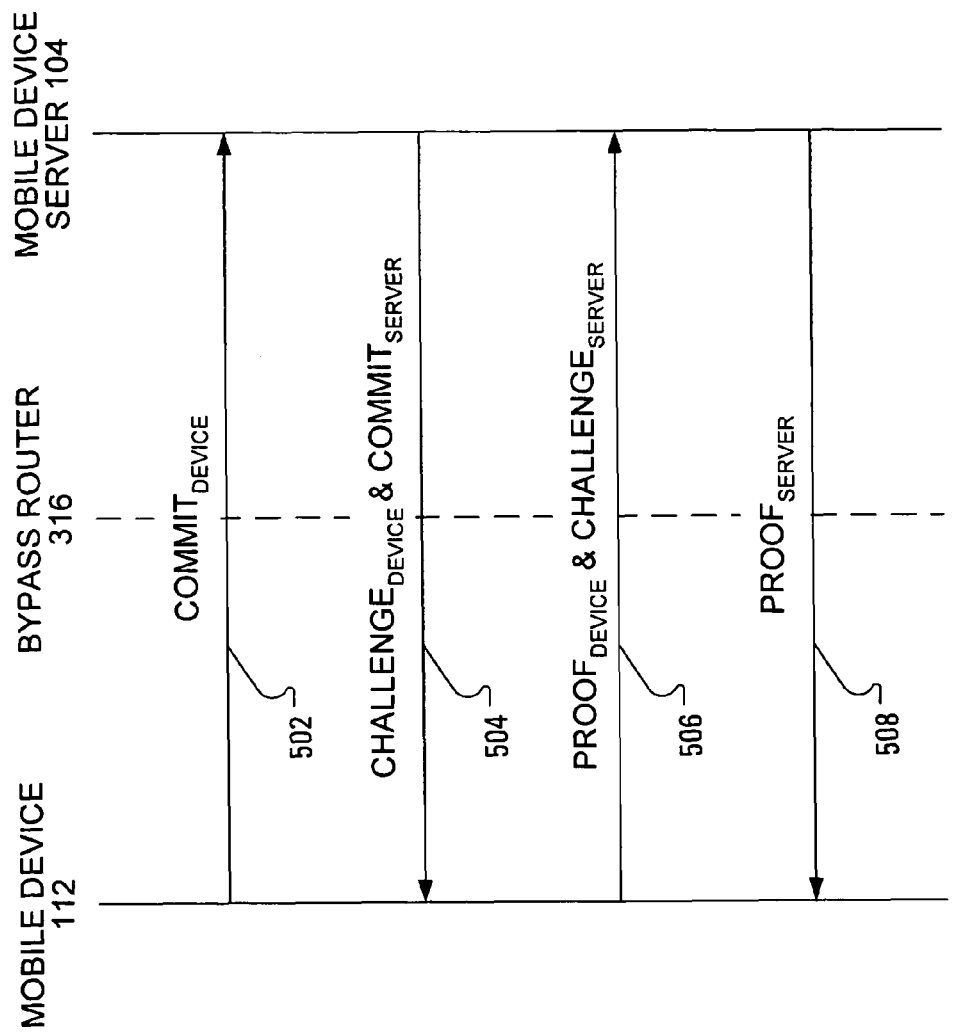
FIG. 5 illustrates packet flow in an interleaved authentication sequence between a mobile device server and a mobile data communication device, where the sequence is initiated by the mobile data communication device.

For economy of traffic, the two runs may be interleaved into a four-packet authentication sequence illustrated in FIG. 5. The mobile device 112 initiates authentication immediately after establishing a link with the bypass router 316.

The mobile device 112 initially selects a random number and determines a device commitment using the master encryption key. The mobile device 112 then sends the device commitment to the mobile device server 104 (step 502). The mobile device server 104 selects a random number and determines a server commitment using the master encryption key. The mobile device server 104 also selects a device challenge and sends the server commitment and the device challenge to the mobile device 112 (step 504). The mobile device 112 then uses the received challenge along with the original random number to determine a device proof. The mobile device 112 also selects a server challenge and sends the device proof and the server challenge to the mobile device server 104 (step 506). The mobile device server 104 uses the device commitment, a public cryptographic key associated with the mobile device 112, the device proof and the device challenge to authenticate the mobile device 112. The mobile device server 104 also uses the received server challenge along with the original random number to determine a device proof. The mobile device server 104 then sends the server proof to the mobile device 112 (step 508). The mobile device 112 uses the server commitment, a public cryptographic key associated with the mobile device server 104, the server proof and the server challenge to authenticate the mobile device server 104.

The bypass router 316 may record the information sent between the mobile device 112 and mobile device server 104 and use the information to verify that the mobile device 112 and mobile device server 104 have properly authenticated each other. In particular, the bypass router 316 may determine a server product from authentication factors including the server proof, the server challenge and the server commitment and may determine a device product from authentication factors including the device proof, the device challenge and the device commitment. If the server product does not equal the device product, the bypass router 316 may consider that the mobile device 112 and mobile device server 104 have not properly authenticated each other. The bypass router 316 may be configured to not forward other types of packets until successful completion of the authentication sequence.

Figure 6:
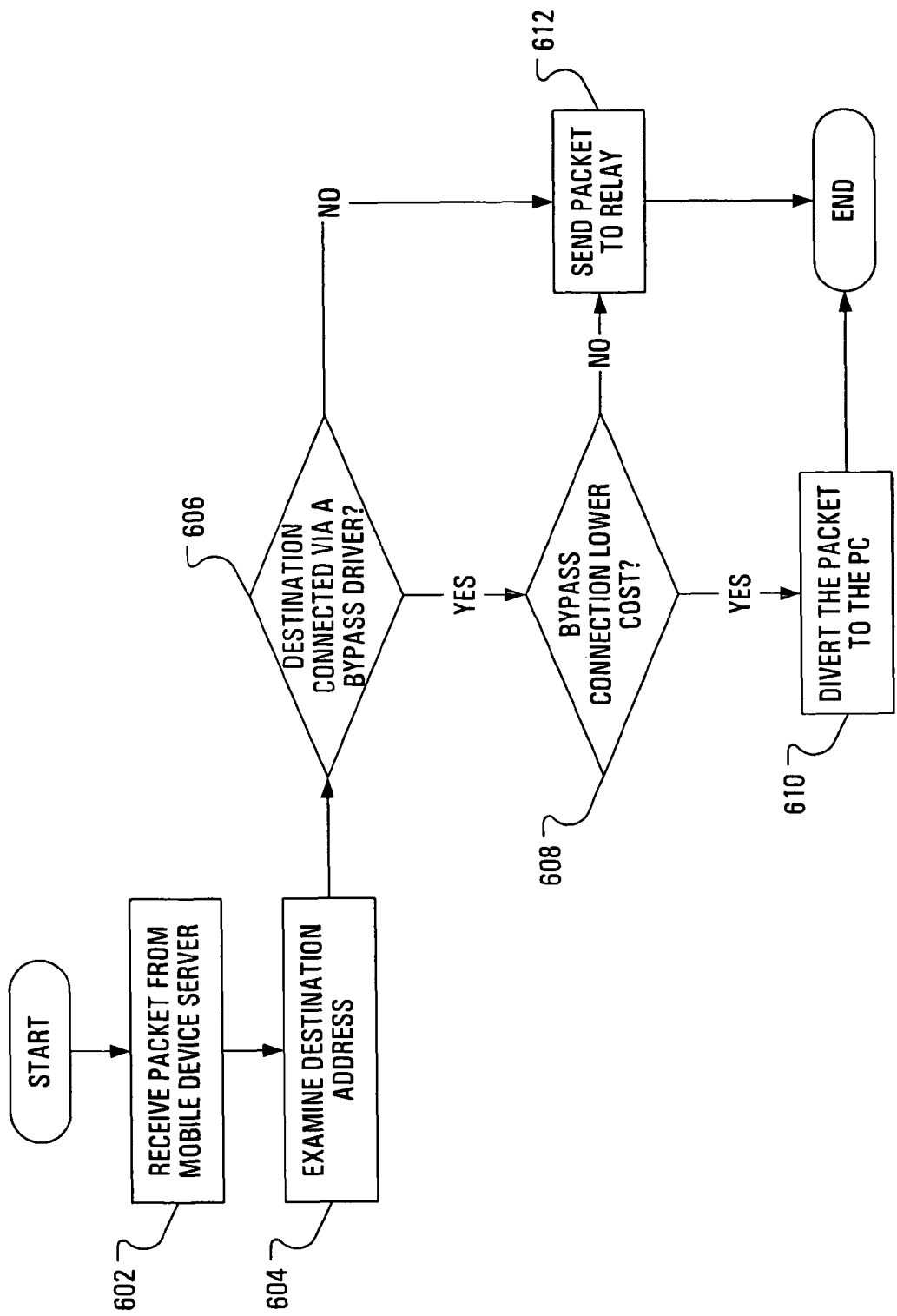
FIG. 6 illustrates steps of a method of handling, at the bypass router, packets from the mobile device server to the mobile data communication device according to an embodiment of the present invention.

Once the mobile device 112 has been authenticated by the mobile device server 104, the flow of packets from the mobile device server 104 to the mobile device 112 via the bypass router 316 and the bypass driver may begin. Steps of an exemplary method of handling, at the bypass router 316, packets from the mobile device server 104 to the mobile device 112 is illustrated in FIG. 6. The bypass router 316 may initially receive a packet (step 602) sent by the mobile device server 104 to the mobile device 112. The bypass router 316 may then examine the destination address of the packet to determine the device identifier of the mobile device 112 (step 604) to which the packet is addressed and determine whether the identified mobile device 112 is known to be connected via a bypass driver (step 606). If the bypass router 316 determines, for instance, that the identified mobile device 112 is connected via a bypass driver executed at the PC 120C, the bypass router 316 then determines (step 608) whether the connection to the mobile device 112 via the bypass router is a lower cost connection that the connection to the mobile device 112 via the relay 107.

If the connection to the mobile device 112 via the bypass router is determined to be the lower cost connection, the bypass router 316 diverts the packet to the PC 120C (step 610). If the bypass router 316 determines that the connection to the mobile device 112 via the relay 107 is the lower cost connection, the bypass router 316 transmits the packet to the relay 107 (step 612) in a conventional manner.

Additionally, if the bypass router 316 determines (step 606) that the mobile device 112 is not connected via a bypass driver, the bypass router 316 transmits the packet to the relay 107 (step 612) in a conventional manner.

Notably, the characteristic used to distinguish the connections (step 608) may be any one or more metrics, where cost is given as an example metric. Speed and reliability of a given connection are other example metrics. Since the connection to the PC 120C at which the bypass driver is executed in conjunction with the connection (serial, USB, Bluetooth™) from the PC 120C to the mobile device 112 is typically characterized as "cheap and fast" when compared to the connection to the mobile device 112 via the relay 107, which may be characterized as "slow and expensive", the comparison of the characteristics of the connections (step 608) may be eliminated completely such that, if a local connection to the bypass driver exists, packets are routed to the bypass driver. That is, the bypass router 316 may be configured so that the local connection always "wins".

The handling, at the bypass router 316, of packets from the mobile device 112 to the mobile device server 104 may be considered more straightforward in that the bypass router 316 is not expected to make a decision as to where to route a given packet received from the mobile device 112. The bypass router 316 may initially receive a packet sent by the mobile device 112 to the mobile device server 104. The bypass router 316 may then transmit the packet to mobile device server 104.

A packet sent to the mobile device 112 via the bypass router 316 and the bypass driver at the PC 120 may be found to be undeliverable, for instance, when the mobile device 112 has been disconnected from the cradle. Such an undeliverable status may cause the bypass driver to transmit an error indication to the bypass router 316. Preferably, the bypass router 316, upon receiving such an error indication, reports to the mobile device server 104 the non-delivery of the packet. This assumes that the mobile device server 104 is configured to support packets being returned in the case of an unreachable mobile device. The mobile device server 104 may then perform a normal set of non-delivery error handling procedures, which procedures often include a second attempt to deliver the packet (a "retry"). The mobile device server 104 is not provided with knowledge that the packet delivery attempt was sent via the bypass driver to the mobile device 112.

In an another instance, the mobile device 112 is initially not connected to a PC 120 and is similarly unreachable via the wireless carrier networks 110. A packet sent to the mobile device 112 by the mobile device server 104 is forwarded by the bypass router 316 to the router 107, given the lack of bypass driver connection. Subsequent to the forwarding, the mobile device 112 forms a serial connection with a PC 120 and the corresponding bypass driver indicates the connection to the bypass router 316. At the relay 107, the packet may be found to be undeliverable. Accordingly, the relay 107 transmits an "unreachable" indication back to the bypass router 316. The bypass router 316 then forwards the "unreachable" indication to the mobile device server 104. Based on the connection of the mobile device 112 to the bypass driver, the bypass router then indicates to the mobile device server 104 that the mobile device 112 is "in service". The mobile device server 104 then resends the packet to the bypass router 316 for forwarding to the relay 107. Instead, the bypass router 316 sends the packet to the bypass driver at the PC 102, where the packet is forwarded to the mobile device 112.

Notably, the bypass router 316 may be configured to forward the packet to the bypass driver upon receiving the "unreachable" indication from the relay 107. However, simplicity of design is maintained by sending the packet all the way back to the mobile device server 104, as standard mechanisms for doing so already exist.

In the case where the mobile device 112 loses wireless connectivity (i.e., loses a connection to the wireless network 110X) but maintains connectivity to the bypass router 316, the bypass router 316 may inform the mobile device server 104 that the mobile device 112 is connected and available to receive data. The mobile device server 104 is, ideally, unaware that the connectivity to the mobile device 112 is via the bypass driver. The end result of this transparency is delivery of data from the mobile device server 104 to the mobile device 112, and vice versa, even when wireless connectivity is not available.

The mobile device 112 may be adapted to sense whether a local connection to the mobile device server 104 or remote connection to the mobile device server 104 is available, or both. For instance, the direct connection may be detected by the mobile device 112 by noting a change in status of one or more serial pins on the RS-232 or USB connector. This contrasts with the mobile device server 104, which is not provided with awareness of the type of connection to the mobile device 112. With this connection-type information sensed, the mobile device 112 can indicate to an application that a lower-cost/higher speed connection is available (i.e., a direct connection versus a wireless connection). The application on the mobile device 112, so informed, can then decide to initiate a bulk-download data transfer or high-volume data exchange with the mobile device server 104 or other servers. Since the mobile device server 104 has no knowledge of the type of connection to the mobile device 112, the mobile device server 104 cannot be expected to determine when to initiate such types of data transfers. The mobile device 112 may, for instance, indicate to the application the type of connectivity available by classifying the characteristics of the connection as either "cheap and fast" or "slow and expensive", these characteristics typically being synonymous with direct and wireless connectivity respectively.

When negotiating the use of the direct connection, the mobile device 112 may be required to provide a list of services to contact. The bypass driver may be capable of determining which of the services, in the provided list of services, are accessible. For example, the bypass driver may be preconfigured with a list of accessible services, or a protocol between the mobile device 112 and the mobile device server 104 may be initiated to test for accessibility through the bypass driver. Since the bypass driver connects through the bypass router 316 to the mobile device server 104, the bypass router 316 may not be able to route certain services such as web client applications or peer-to-peer applications that the mobile device 112 can normally access when connected to the mobile device server 104 via the relay 107. Therefore, those packets that the bypass router 316 is unable to route to the mobile device 112 may have to be forwarded, by the bypass router 316, to the relay 107 for further routing.

The bypass router 316 offers an additional level of security for packets routed between the mobile device server 104 and the mobile device 112 as compared to the scenario wherein packets are routed via the relay 107 and the wireless network 110. The bypass router 316 may operate a unique authentication protocol as part of the protocol used for exchanges between the mobile device 112 and the mobile device server 104. Using this unique protocol, the bypass router 316 can verify that the mobile device 112 and mobile device server 104 have successfully authenticated each other without needing to know the secret master encryption key shared between the mobile device 112 and mobile device server 104.

The bypass router 316 may also offer the serial bypass service to mobile devices that operate using Wireless Local Area Networking (WLAN) technology.

Figure 7:
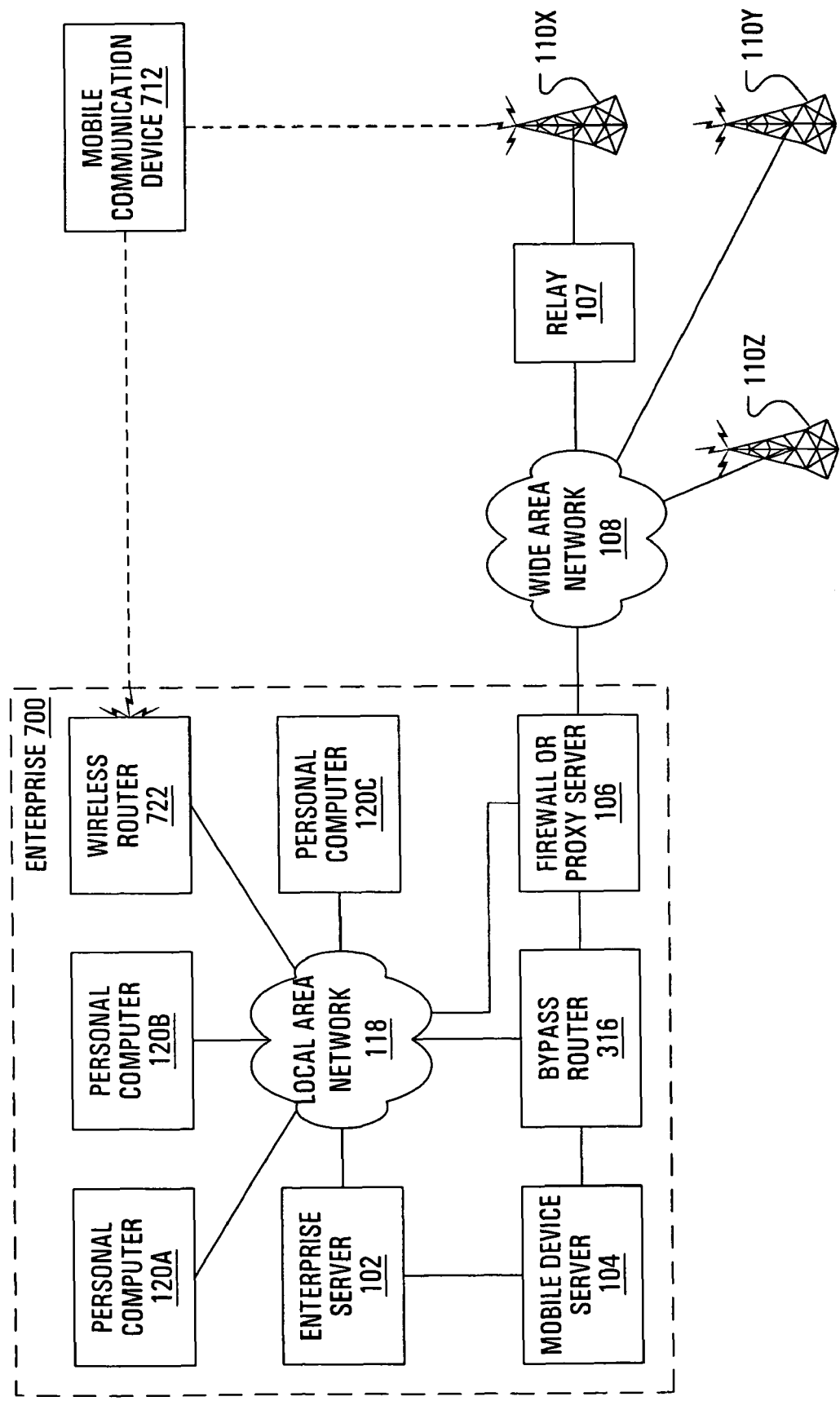
FIG. 7 illustrates a communication network including an enterprise with dual wireless connections to a mobile data communication device, where the enterprise includes a bypass router according to an embodiment of the present invention.

In FIG. 7, an enterprise 700 is illustrated with many elements in common with the enterprise 300 of FIG. 3. Among the elements of the enterprise 700 of FIG. 7 not found in the enterprise 300 of FIG. 3 is a wireless router 722. Wirelessly connected to the wireless router 722 is a mobile device 712 with WLAN connectivity supported. WLAN connectivity may, for example, be provided according to IEEE standards such as 802.11b, 802.11a, 802.11g. The mobile device 712 with WLAN connectivity supported has the bypass driver software built-in and, as such, not need to rely on a physical serial link to a personal computer. Essentially, the WLAN becomes the equivalent of the local connection to the bypass driver and a connection internal to the mobile device 112 becomes the equivalent of the direct connection between the bypass driver and the mobile device. The bypass router 316 can offer a bypass function to the mobile device 712 that operates in "dual wireless modes". The "dual-mode" mobile device 712 may support typical Wireless Wide-Area Network (WWAN) connectivity via one of the cellular network technologies available through the wireless carrier networks 110 as well as a WLAN connectivity via the wireless router 722. The cellular network technologies include GSM/GPRS, CDMA/1X Evolution Data Only (EvDO), or Third Generation Cellular (3G). The bypass router 316 then may offer the bypass function when the mobile device 712 is connected to the enterprise 700 of FIG. 7 via the WLAN technology. The WLAN type of connectivity may be considered to equate to the previously discussed local connection because WLAN connectivity may be considered to offer a "cheap and fast" data transfer characteristic.

As will be appreciated, although not illustrated, there may a situation wherein the mobile device 712 is connected to the LAN 118 via the wireless router 722 in addition to being connected to the LAN 118 via a connection to the PC 120C and being connected to the relay 107 via the wireless network 110X. That is, the bypass router 316 may be required to select between three connections to the mobile device 712.

Figure 8:
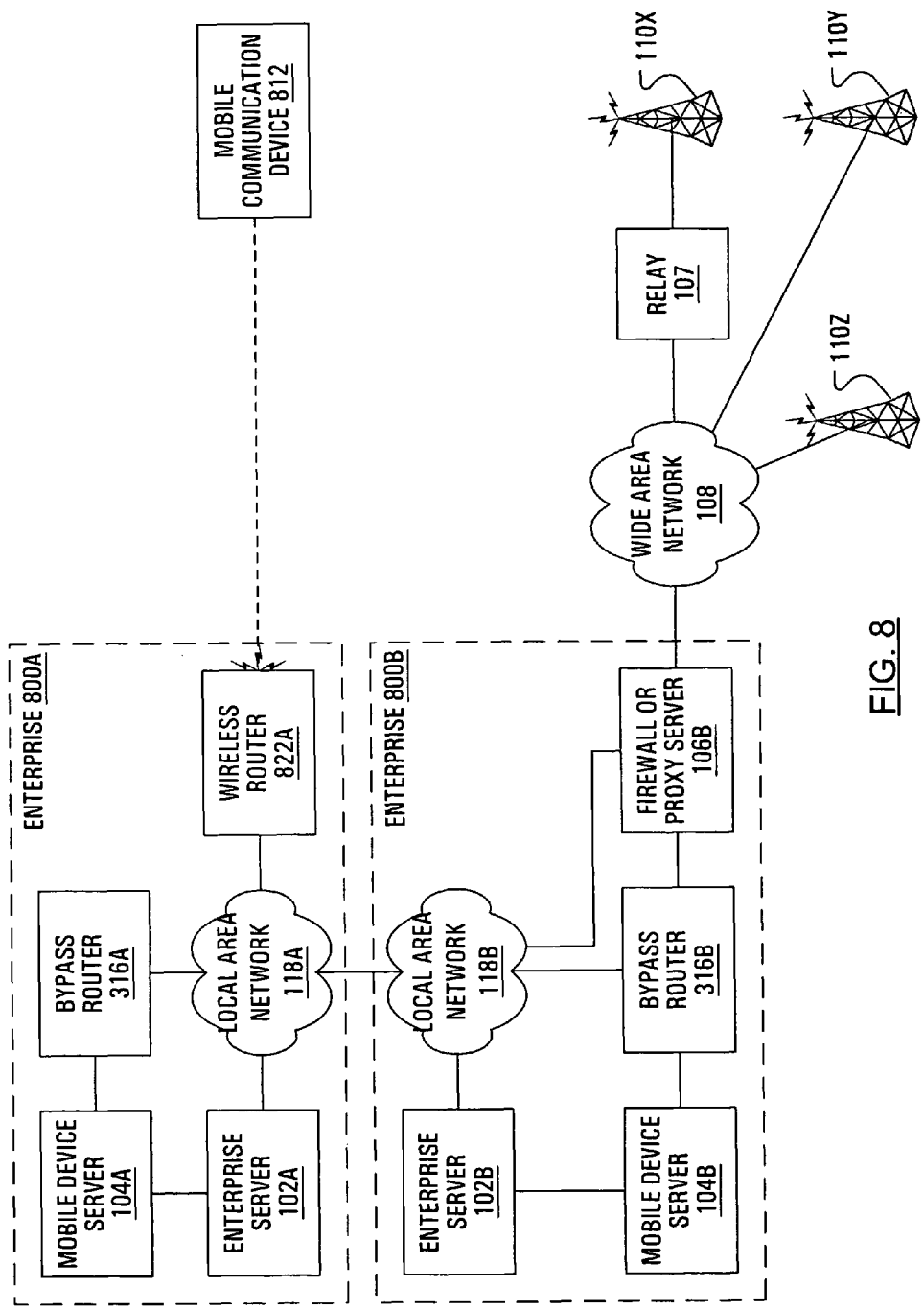
FIG. 8 illustrates a communication network including two enterprises, one enterprise with a wireless connection to a mobile data communication device and a bypass router, and second enterprise including a second bypass router, where the bypass routers may communicate with each other according to an embodiment of the present invention.

In FIG. 8, a first enterprise 800A is illustrated connected to a second enterprise 800B. Those elements of the first enterprise 800A that are illustrated include a first LAN 118A connected to a first enterprise server 102A, a first bypass router 316A and a wireless router 822A. Additionally, the first enterprise server 102A and the first bypass router 316A are connected to a first mobile device server 104A.

Similarly, those elements of the second enterprise 800B that are illustrated include a second LAN 118B connected to a second enterprise server 102B, a second bypass router 316B, the first LAN 118A and a firewall or proxy server 106B, which firewall 106B is also connected to the second bypass router 316B. Additionally, the second enterprise server 102B and the second bypass router 316B are connected to a first mobile device server 104A.

Consider a mobile device 812 that is only WLAN capable and is associated with the second mobile device server 104B. In such a case, the first bypass router 316A may become the only router for packets to the second mobile device server 104B from the mobile device 812 and in the reverse direction. Consequently, the relay 107 is never used for routing packets to the WLAN-only capable mobile device 812.

By installing the second bypass router 316B behind all corporate firewalls, it is possible to create a hybrid wireless network cluster based on WLAN technology. The first bypass router 316A and second bypass router 316B can be self-configuring such that data received at the first bypass router 316A could be routed to the second bypass router 316B, i.e., the bypass router 316B that is connected to the second mobile device server 104B that the WLAN-only capable mobile device 812 is trying to reach. This could be considered a loosely-coupled, dynamically-configured network cluster. Bypass routers 316 connected in this way may also be used for WWAN type networks but the model and usefulness is less clear.

A generic bypass router is essentially a router with knowledge of the location and type of connectivity available to a specific mobile device. As bypass routers can, be interconnected, as shown via the first LAN 118A and the second LAN 118B, there is an allowance for the building of networks of bypass routers 316 that can provide lower cost routing and utilization of landline networking equipment, as well as redundancy in the case of failed network links, and packet traffic load balancing. Interconnecting bypass routers 316 also allows packets to flow across firewalls, thus extending the range of connectivity for a mobile device operating outside a corporate domain.

Given the capabilities of the bypass router 316, it may be considered further advantageous to allow for a data transfer that has already begun over a remote connection to be re-routed to a local connection if a local connection becomes available or, conversely, to allow for a data transfer to be continued over a remote connection if a local connection, in use for the initial stages of the data transfer, becomes unavailable.

By using explicit acknowledgements, the bypass router 316 (FIG. 3) may be able to determine whether those packets that have been sent to the mobile device 112 has been received by the mobile device 112. When packets sent over a first connection to the mobile device 112 are not acknowledged and the bypass router 316 receives an indication that the mobile device 112 has become available over a second connection, the unacknowledged packets may then be routed to the mobile device 112 through over the second connection.

Additionally, based on the cost and speed of the newly available second connection, it may that larger quantities of data may now be transferred to the mobile device 112 than could practically be transferred to the mobile device 112 over the first connection. Transfer of these larger quantities of data may have been suspended earlier, based on the cost and speed of the first connection. For example, when performing large bulk synchronization to a newly commissioned mobile device, the large data transfers may be suspended by the bypass router 316 until the mobile device is accessible via a low-cost, high-bandwidth local connection.

Although not presented as part of the present specification, it should be understood that many protocols, either novel or pre-existing, may have to be employed to facilitate communication: between the mobile device server 104 and the bypass router 316; between the PC 120C and the mobile device 112; and between a first bypass router 316A and a second bypass router 316B.

Advantageously, when the mobile device 112 is connected to the local network, it is normally very cost effective to transfer data via the local connection, even when a remote connection is simultaneously available. Such cost effectiveness is often due to the economics of data transmission using wireline technology versus wireless technology, where wireline networks tend to be significantly cheaper, and offer higher bandwidth, than wireless networks. Exploiting local connectivity may provide lower data delivery charges to the user and may offer high quality data delivery. Therefore, using this local network connectivity, when available, may provide an overall higher quality product for the user.

Other modifications will be apparent to those skilled in the art and, therefore, the invention is defined in the claims.

We claim:

1. A method of routing protocol units between a mobile device server and a mobile data communication device, said mobile device server for serving information to said mobile data communication device, said mobile communication device capable of receiving said protocol data units over a first network connection and a second network connection, said method comprising:

at a routing device interposed between said mobile device server and said mobile data communication device:

receiving server authentication protocol data units from said mobile device server, said server authentication protocol data units directed for delivery over said first network connection, said server authentication protocol data units specifying a destination address;

determining an identity of said mobile data communication device from said destination address;

receiving mobile authentication protocol data units from said mobile data communication device;

based on said server authentication protocol data units and said mobile authentication protocol data units, determining whether said mobile device server has properly authenticated itself to said mobile data communication device and whether said mobile data communication device has properly authenticated itself to said mobile device server;

determining whether said mobile data communication device has established a connection with said second network connection whereby said mobile data communication device is capable of receiving protocol data units over said second network connection;

where said mobile device server has properly authenticated itself to said mobile data communication device and said mobile data communication device has properly authenticated itself to said mobile device server and where said mobile data communication device has established a connection with said second network connection, redirecting protocol data units from said mobile device server directed for delivery to said mobile data communication device over said first network connection to said mobile data communication device over said second network connection.

2. The method of claim 1 further comprising, before determining whether said mobile data communication device has established a connection with said second network connection:

receiving an indication that said mobile data communication device associated with said identity has formed a device connection with another apparatus; and forming said second network connection to said another apparatus.

3. The method of claim 2 further comprising:

receiving a device authentication packet from said mobile data communication device via said another apparatus;

recording a device authentication factor from said device authentication packet, said device authentication factor for use in forming a device authentication product; and transmitting said device authentication packet to said mobile device server.

4. The method of claim 3 further comprising:

forming a server authentication product from said server authentication protocol data units;

forming a device authentication product from said device authentication factors;

comparing said server authentication product to said device authentication product; and processing further packets having said destination address based on the result of said comparing.

5. The method of claim 2 further comprising:

receiving an indication of a termination of said device connection between said another apparatus and said mobile data communication device associated with said identity; and recording an identity of said another apparatus as a last-known location of said mobile data communication device.

6. The method of claim 2 wherein said device connection formed with said another apparatus by said mobile data communication device is a direct wire connection.

7. The method of claim 6 wherein said direct wire connection is a Universal Serial Bus connection.

8. The method of claim 6 wherein said direct wire connection is a 9-pin serial connection.

9. The method of claim 2 wherein said device connection formed with said another apparatus by said mobile data communication device is a wireless connection.

10. The method of claim 9 wherein said wireless connection is a Bluetooth connection.

11. The method of claim 9 wherein said wireless connection is a wireless local area network connection.

12. The method of claim 9 wherein said wireless connection is an infrared connection.

13. The method of claim 1 further comprising, before determining said association:
receiving an indication that said mobile data communication device associated with said identity has formed a first device connection with a first apparatus; and
forming a first network connection to said first apparatus.

14. The method of claim 13 further comprising:
receiving an indication of a termination of said first device connection between said first apparatus and said mobile data communication device; and
recording an identity of said first apparatus as a last-known location of said mobile data communication device.

15. The method of claim 1 wherein said determining whether said mobile device server has properly authenticated itself to said mobile data communication device and whether said mobile data communication device has properly authenticated itself to said mobile device server comprises extracting factors from said server authentication protocol data units and said mobile authentication protocol data units which factors accord to a Schnorr identification scheme.

16. The method of claim 15 wherein said factors comprise a mobile commitment sent from said mobile data communication device to said mobile device server, a server challenge sent from said mobile device server to said mobile data communication device, and a mobile proof sent from said mobile communication device to said mobile device server.

17. The method of claim 16 wherein said factors further comprise a server commitment sent from said mobile device server to said mobile data communication device, a mobile challenge sent from said mobile data communication device to said mobile device server, and a server proof sent from said mobile device server to said mobile data communication device.

18. The method of claim 17 wherein said determining whether said mobile device server has properly authenticated itself to said mobile data communication device and whether said mobile data communication device has properly authenticated itself to said mobile device server comprises:
obtaining a server authentication product from said server proof, said server challenge, and said server commitment;
obtaining a mobile device authentication product from said mobile proof, said mobile challenge, and said mobile commitment; and
comparing said server authentication product to said device authentication product.

19. The method of claim 1, wherein it further comprises:
transmitting said mobile authentication protocol data units to said mobile device server; and
transmitting said server authentication protocol data units to said mobile data communication device.

20. The method of claim 2 wherein said receiving an indication comprises receiving an indication that said mobile data communication device has formed a device connection with a personal computer.

21. The method of claim 1 wherein said redirecting protocol data units from said mobile device server directed for delivery to said mobile data communication device over said first network connection to said mobile data communication device over said second network connection comprises redirecting protocol data units directed for delivery to said mobile data communication device over a wide area network connection to said mobile data communication device over a local area network connection.

22. A routing device interposed between a mobile device server and mobile communication devices, said routing device comprising:
a routing device receiver for receiving protocol data units from said mobile device server of information to said mobile data communication devices for delivery over a first network connection, said protocol data units specifying a destination address, some of said protocol data units from said server being server authentication protocol data units;
a routing device receiver for receiving protocol data units from said mobile communication devices;
a routing device processor adapted to:
in respect of given protocol data units received from said mobile device server, determine an identity of a mobile data communication device from said destination address; and
determine whether said mobile data communication device has established a connection with a second network connection;
in respect of particular protocol data units received from said mobile data communication device whose identity was determined from the destination address, determine that said particular protocol data units are mobile authentication protocol data units;
based on said server authentication protocol data units and said mobile authentication protocol data units, determine whether said mobile device server has properly authenticated itself to said mobile data communication device and whether said mobile data communication device has properly authenticated itself to said mobile device server;
responsive to said determining whether said mobile data communication device has established a connection with a second network connection and said authentication determination, redirect protocol data units from said mobile device server directed for delivery to said mobile data communication device over said first network connection over said second network connection; and
a routing device transmitter for transmitting said protocol data units over said second network connection.

23. The apparatus of claim 22 wherein said processor is adapted to, before determining said association:
receive an indication that said mobile data communication device associated with said identity has formed a device connection with a another apparatus; and
form said second network connection to said another apparatus.

24. The routing device of claim 22 wherein said first network connection is a wide area network connection and wherein said second network connection is a local area network connection.

25. A computer readable medium containing computer-executable instructions that, when performed by processor in a routing device interposed between a mobile device server and mobile communication devices, cause said routing device to:
receive at a receiver of said routing device protocol data units from said mobile device server of information to said mobile data communication devices directed for delivery over a first network connection, said protocol data units specifying a destination address, some of said protocol data units from said server being server authentication protocol data units;

receive at a receiver of said routing device protocol data units from said mobile communication devices;

in respect of given protocol data units received from said mobile device server, determine an identity of a mobile data communication device from said destination address; and determine whether said mobile data communication device has established a connection with a second network connection;

in respect of particular protocol data units received from said mobile data communication device whose identity was determined from the destination address, determine that said particular protocol data units are mobile authentication protocol data units;

based on said server authentication protocol data units and said mobile authentication protocol data units, determine whether said mobile device server has properly authenticated itself to said mobile data communication device and whether said mobile data communication device has properly authenticated itself to said mobile device server; and responsive to said determining whether said mobile data communication device has established a connection with a second network connection and said authentication determination, redirect using a transmitter of said routing device protocol data units from said mobile device server directed for delivery to said mobile data communication device over said first network connection over said second network connection.

26. The computer readable medium of claim 25 wherein said computer executable instructions, before causing said processor to determine said association, causes said processor to:

receive an indication that said mobile data communication device associated with said identity has formed a device connection with another apparatus; and form said second network connection to said another apparatus.

* * * * *

UNITED STATES PATENT AND TRADEMARK OFFICE
CERTIFICATE OF CORRECTION

| | | |
|---|---|---|
| PATENT NO. | : 7,853,242 B2 | Page 1 of 1 |
| APPLICATION NO. | : 11/015007 | |
| DATED | : December 14, 2010 | |
| INVENTOR(S) | : Allan David Lewis et al. | |

It is certified that error appears in the above-identified patent and that said Letters Patent is hereby corrected as shown below:

Claim 1 - column 16, line 3: remove the indication of a new paragraph starting between the words "and" and "whether"

Claim 23 - column 18, line 52: change "with a another" to "with another"

Signed and Sealed this
Twenty-first Day of June, 2011

David J. Kappos
*Director of the United States Patent and Trademark Office*